Aug. 28, 1934.　　　J. DE MOOY　　　1,971,773

RIVETING MACHINE

Filed April 9, 1931

JOHN DE MOOY
INVENTOR

BY　*John E. Reufer*
ATTORNEY

Patented Aug. 28, 1934

1,971,773

UNITED STATES PATENT OFFICE 1,971,773

RIVETING MACHINE

John De Mooy, Cleveland, Ohio, assignor to The Cleveland Pneumatic Tool Company, Cleveland, Ohio, a corporation of Ohio Application April 9, 1931, Serial No. 528,787

7 Claims. (Cl. 121—5)

This invention relates to pneumatic machines and particularly to pneumatic riveting machines. The principal object of this invention is to provide automatic means for rotating the dolly or riveting tools of a pneumatic riveter in order to insure a smooth even upsetting of the end of the rivet and avoid bending the rivet over. Another object is to construct a machine of this type in such a manner that a single valve may be used to control the rotation of the dolly, the feeding of the machine to the work and the reciprocation of the piston hammer.

Other objects relating to details of construction and economies of manufacture will appear hereinafter.

Figure 2:
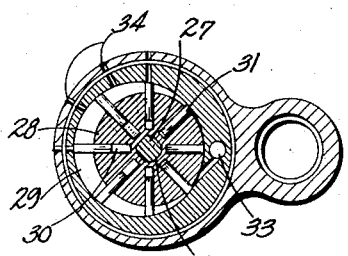
Figure 2 is a section taken substantially on the line 2—2 of Figure 1.
Figure 1:
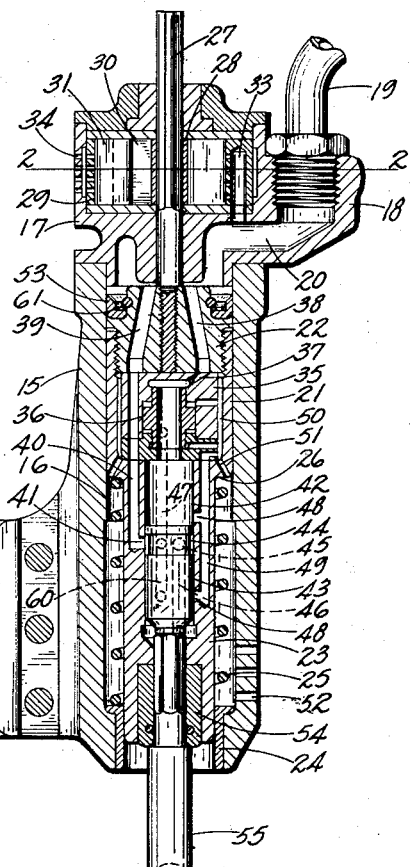
Figure 1 is a view partly in elevation and partly in section of a machine constructed in accordance with this invention.
Figure 1:
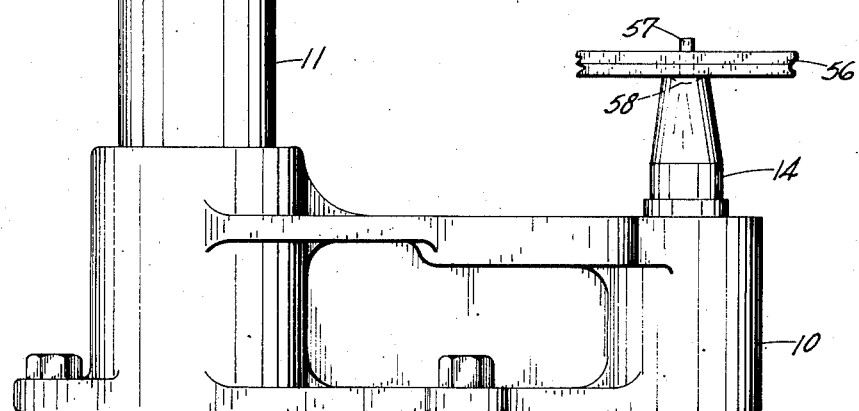

Referring to the drawing, numeral 10 designates a supporting frame arranged to be secured to a table or other convenient base. The frame 10 is provided with a vertical post 11 upon which an arm 12 is slidably mounted. The arm 12 is preferably split and provided with bolts 13 for securing the same in any desired position of vertical adjustment. The frame 10 is also provided with an upstanding anvil 14 spaced from the post 11.

A casing 15 is carried by the end of the arm 12 and houses the riveting mechanism. The casing 15 is formed with a bore 16 extending therethrough and closed at the upper end by a head 17, the latter being formed with a boss 18 arranged to receive the main fluid supply line 19 and having a fluid passage therethrough.

A cylinder 21 closed at its upper end by a screw threaded bushing 22 and having a reduced extension 23 at its lower end is slidably mounted in the bore 16 of the casing 15. The casing 15 is provided with a bushing 24 at its lower end which slidably receives and guides the extension 23. A spring 25 engaging the bushing 24 and the shoulder 26 formed at the junction of the cylinder 21 with the reduced extension 23 normally maintains the cylinder raised within the casing 15. It will be observed that the raising of the cylinder 21 within the casing 15 is limited by the abutment of the bushing 22 with the head 17.

A splined stem 27 is fixed to the bushing 22 and projects upwardly therefrom through the head 17. Any suitable type of rotation mechanism is arranged in the head 17 to slidably receive and rotate the stem 27. In the embodiment shown in the drawing a blade turbine is mounted within the head 17 and includes a rotor 28 rotatable within an eccentric cylinder 29 and having a plurality of recesses 30 within which blades 31 are slidably mounted. The rotor 28 is provided with a central aperture 32 which is splined to slidably receive the stem 27. An inlet port 33 leads from the passage 20 to one side of the eccentric cylinder 29 and exhaust ports 34 open to atmosphere from the other side of the cylinder.

A valve chest 35 is secured in the cylinder 21 between the bushing 22 and the shoulder 26 and houses a distributing valve of any suitable type controlling the reciprocation of the piston hammer. As shown herein the distributing valve and piston hammer are constructed as disclosed in my co-pending application Serial No. 428,605, filed February 15, 1930. The slide valve 36 is reciprocably mounted within the valve chest 35 and is arranged to close or open a fluid passage 37 formed in the valve chest and communicating with a passage 38 extending through the bushing 22. A second passage 39 extending through the bushing 22 opens into a conduit 40 extending through the wall of the reduced extension 23. A port 41 opens from the conduit 40 into the cylindrical bore 42 of the reduced extension 23 within which the piston hammer 43 reciprocates. The piston 43 is formed with an annular groove 44 arranged to register with the port 41 when the piston is in its lowermost position and communicating with lateral passage 45 and longitudinal passage 46 formed in the wall of the reduced extension 23 arranged to conduct fluid from the port 41 to the lower end of the cylindrical bore 42. Passage 47 formed in the side wall of the reduced extension 23 is arranged to conduct motive fluid from the port 41 to the valve 36 and to exhaust the pressure therefrom through passage 60 to afford the reciprocation of the valve. The opposite ends of the cylindrical bore 42 are exhausted through exhaust ports 48 which open to a passage 49 communicating with an annular recess 50 between the cylinder 21 and the valve chest 35. Ports 51 lead from the recess 50 to the space between the outer wall of the extension 23 and the casing 15 which is open to atmosphere through ports 52.

Motive fluid enters from the supply line 19 through the passage 20 in the head and enters the two passages 38 and 39 formed through the bushing 22. This fluid controls the slidable valve 36 and reciprocates the piston hammer 43 in the manner disclosed in my aforesaid co-pending application and exhausts to atmosphere through the ports 60 and 48, passage 49, recess 50, and ports 51, and 52.

The bushing 22 is provided at its upper end with a gasket or packing of any suitable type 53 secured thereto by a spring clamp 61. The cylinder 21 and extension 23 are closed at the upper end by the packed bushing 22, thus constitute in effect a piston reciprocable within the bore 16 in the casing 15.

Motive fluid entering through the passage 20 acts against the packing 53, affording thereby a fluid tight engagement with the inside wall of the bore 16, and moves the entire assembly downwardly against the tension of the spring 25.

The lower end of the extension 23 is provided with a hexagonal opening or chuck 54 within which is slidably received the dolly or rivet set 55. Any suitable means may be employed for preventing accidental removal of the dolly 55 from the extension 23.

In using the riveting machine a foot pedal or hand lever of any convenient type (not shown) may be provided to control the throttle valve in the main fluid supply line 19. The arm 12 is adjusted at the desired height on the post 11 and the work, illustrated as a pair of plates 56, is placed upon the anvil 14 with the head of the rivet 57 engaged in the recess 58 in the top of the anvil. The foot pedal is operated to open the throttle valve and motive fluid entering through the main supply line 19 passes through the inlet passage 33 and actuates the rotation mechanism to rotate the stem 27, the bushing 22, cylinder 21, and the dolly 55 within the casing 15. The fluid pressure on the upper surface of packing 53 and bushing 22 forces the cylinder 21 downwardly in the casing 15 against the tension of the spring 25 and brings the dolly 55 into engagement with the upper end of the rivet 57. Fluid passing through the passages 38 and 39 in the bushing 22 causes reciprocation of the piston hammer 43 which strikes the upper end of the dolly 55 on each downward stroke and upsets the rivet 57 in the usual manner to secure the plates 56 together. However due to the abutting relation of the bushing 22 with the head 17 when the cylinder is at the extreme end of its raised position within the casing 15, the passages 38 and 39 will remain closed by the head 17 till the fluid creates enough pressure on the upper surface of the packing 53 and the bushing 22 to force the cylinder downwardly thus separating the bushing 22 from the head 27 and allowing the admission of motive fluid through the passages 38 and 39 into the cylinder 21 to cause the reciprocation of the piston hammer 43. With this provision the fluid will be admitted into the rotor 28 through the passage 33 causing the rotation of the dolly 55 to take place before the reciprocation of the piston hammer 43 thus preventing the upsetting of the rivet 57 with a dolly deprived of rotation. When the riveting is completed the foot pedal is operated to close the throttle valve and the spring 25 returns the cylinder 21 to its raised position within the casing 15. It will be evident that the arrangement of the parts provides a continuous rotation of the dolly during the riveting operation thereby avoiding any danger of the end of the rivet being bent over to one side or the other.

Although the invention has been disclosed as applied to a stationary riveting machine, it is to be understood that it could, if desired, be applied to other types of pneumatic tools. It is also to be understood that although a preferred form of rotation mechanism and a preferred arrangement of the distribution valve and piston hammer has been disclosed, other types of rotation mechanisms and valve constructions can be used if desired. Various other modifications and rearrangements of parts may be resorted to without departing from the spirit or scope of the invention as defined in the following claims.

I claim:

1. In a riveting machine, the combination of a supporting base carrying an anvil, a casing supported above said anvil, a cylinder slidably and rotatably mounted in said casing, a tool slidably mounted in said cylinder for rotation therewith and adapted to cooperate with said anvil, a piston reciprocable in said cylinder for acting upon said tool, a head on said casing enclosing a fluid actuated rotation mechanism connected to said cylinder for imparting rotation thereto, fluid passages for admitting motive fluid to said rotation mechanism for actuating the same and for admitting motive fluid within said casing for inducing said cylinder in one direction, and other passages within said cylinder for admitting motive fluid therein to actuate said piston, said last mentioned passages being normally closed by said head.

2. In a riveting machine, the combination of a casing, a rotation mechanism carried by said casing, a cylinder reciprocably and rotatably mounted in said casing and connected to said rotation mechanism for rotation therewith, a spring chamber between said casing and said cylinder, a spring within said chamber for normally maintaining said cylinder in its rearward position, a piston reciprocable within said cylinder, fluid passages arranged to conduct motive fluid to said rotation mechanism for actuating the same and for admitting motive fluid within said casing for moving said cylinder forwardly, and other passages within said cylinder for admitting motive fluid therein to actuate said piston, said last mentioned passages being arranged to be closed in the rearmost position of said cylinder and opened immediately after the beginning of the forward displacement of said cylinder.

3. In a riveting machine, the combination of a supporting base comprising an anvil capable to receive the rivet, a casing supported above said anvil, a percussion mechanism comprising a cylinder rotatably and slidably mounted within said casing, a fluid actuated piston reciprocably mounted within said cylinder capable of engagement with a tool for upsetting the rivet, a rotation mechanism connected to said cylinder for rotating the latter, a motive fluid inlet passage, inlet ports in constant communication with said inlet passage for simultaneously admitting pressure fluid to said rotation mechanism and said cylinder for causing the rotation and slidable movement of the latter, and means depending on the initial slidable movement of said cylinder for admitting motive fluid into the latter to actuate said piston.

4. In a riveting machine, the combination of a supporting base comprising an anvil capable to receive the rivet, a casing supported above said anvil, a percussion mechanism comprising a cylinder rotatably and slidably mounted within said casing, a piston reciprocably mounted within said cylinder capable of engagement with a tool for upsetting the rivet, a rotation mechanism connected to said cylinder for rotating the latter, means for simultaneously admitting motive fluid to said rotation mechanism and said cylinder for causing the rotation and slidable movement of the latter, and other means for admitting motive fluid into said cylinder to actuate said piston, the opening of said other means being responsive to the initial slidable movement of said cylinder.

5. In a fluid actuated machine, a casing having a cylinder rotatably and slidably mounted therein, a piston reciprocably mounted within said cylinder, a head on said casing enclosing a rotation mechanism connected to said cylinder for imparting rotation thereto, means for normally maintaining said cylinder in engagement with said head, other means for simultaneously admitting motive fluid to said rotation mechanism and said cylinder for rotating and actuating the latter away from said head, and further means for automatically admitting motive fluid into said cylinder to actuate said piston immediately after the initial movement of said cylinder away from said head.

6. In a fluid actuated machine, a casing having a cylinder slidably mounted therein, a stationary member within said casing capable of engagement with said cylinder for limiting the slidable movement of the latter in one direction, means for normally maintaining said cylinder in engagement with said member, a passage for admitting motive fluid to said cylinder for actuating the latter away from said member, and passages for admitting motive fluid into said cylinder to actuate said piston, said passages being normally closed by said member.

7. In a fluid actuated machine, a casing having a cylinder slidably mounted therein, a stationary member carried by said casing capable of engagement with said cylinder for limiting the slidable movement of the latter in one direction, means for normally maintaining said cylinder in engagement with said member, a passage for admitting motive fluid to said cylinder for actuating the latter away from said member, and passages for admitting motive fluid into said cylinder to actuate said piston the admission of the motive fluid into said cylinder via said passages being responsive to the initial movement of said cylinder away from said member.

JOHN DE MOOY.